US008136081B2

United States Patent
Keerthi et al.

(10) Patent No.: US 8,136,081 B2
(45) Date of Patent: Mar. 13, 2012

(54) METHOD AND APPARATUS TO OPTIMIZE ADAPTIVE RADIO-FREQUENCY SYSTEMS

(75) Inventors: Arvind V. Keerthi, Bangalore (IN); Prashant Choudhary, Milpitas, CA (US)

(73) Assignee: Scintera Networks, Inc., Sunnyvale, CA (US)

( * ) Notice: Subject to any disclaimer, the term of this patent is extended or adjusted under 35 U.S.C. 154(b) by 223 days.

(21) Appl. No.: 12/762,098

(22) Filed: Apr. 16, 2010

(65) Prior Publication Data

US 2011/0258591 A1    Oct. 20, 2011

(51) Int. Cl.
*G06F 17/50* (2006.01)
(52) U.S. Cl. .................. 716/136; 716/132; 716/134
(58) Field of Classification Search .............. 716/132, 716/134, 136
See application file for complete search history.

(56) References Cited

U.S. PATENT DOCUMENTS

| | | | | |
|---|---|---|---|---|
| 5,818,655 | A * | 10/1998 | Satoh et al. | 360/65 |
| 6,661,594 | B2 * | 12/2003 | Satoh et al. | 360/65 |
| 7,318,210 | B1 * | 1/2008 | Singh et al. | 716/121 |
| 7,360,190 | B1 * | 4/2008 | Singh et al. | 716/113 |
| 2003/0035236 | A1 * | 2/2003 | Satoh et al. | 360/65 |
| 2010/0088657 | A1 * | 4/2010 | Bantas et al. | 716/4 |

* cited by examiner

*Primary Examiner* — Stacy Whitmore

(74) *Attorney, Agent, or Firm* — Edward C. Kwok; Haynes and Boone, LLP

(57) ABSTRACT

A performance optimizing circuit is provided for a signal processing system which is parameterized by a set of coefficients that vary the operational characteristics of the signal processing system. The performance optimizing circuit receives as input a reference signal and an output signal of the signal processing system. The performance optimizing circuit may include (a) a cost computation circuit that receives the reference signal and the output signal and provides as output a cost signal representing a cost function computed using a set of current values for the set of coefficients, the output signal and the reference signal; and (b) a cost optimizer circuit that, at each of a plurality of successive time intervals, evaluates one or more values of the cost signal in the cost computation circuit and provides to the signal processing system a new set of values for the set of coefficients. The cost optimizer circuit implements two or more of the random search, parabolic interpolation and hill climbing techniques.

22 Claims, 3 Drawing Sheets

An example implementation/application of the Invention.

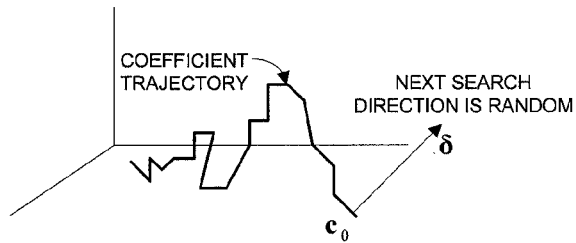
Figure 1. Illustrating Random Search
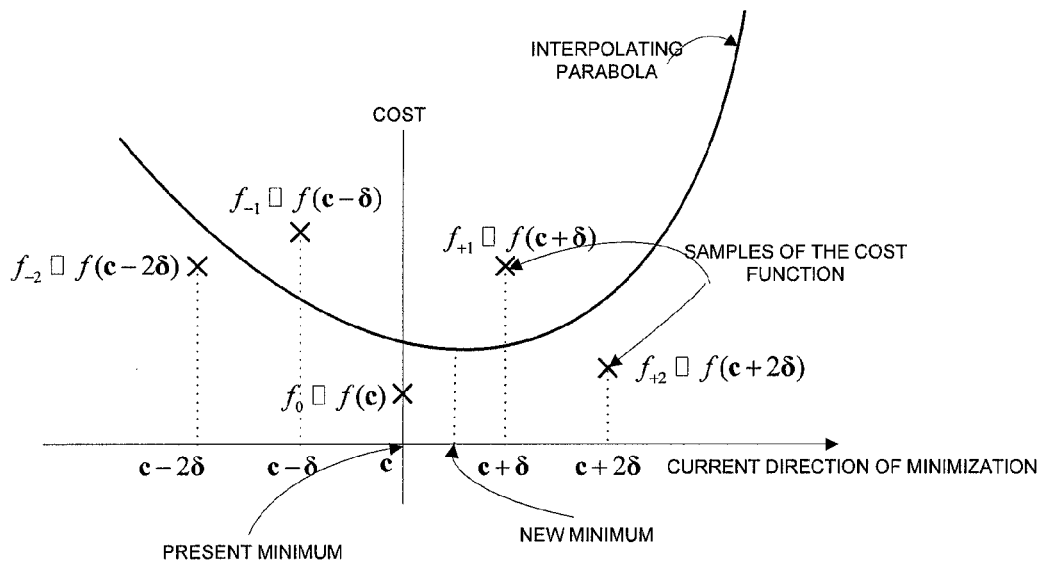
Figure 2. Parabolic interpolation, equivalent to Newton-Raphson minimization, along the current direction of minimization.

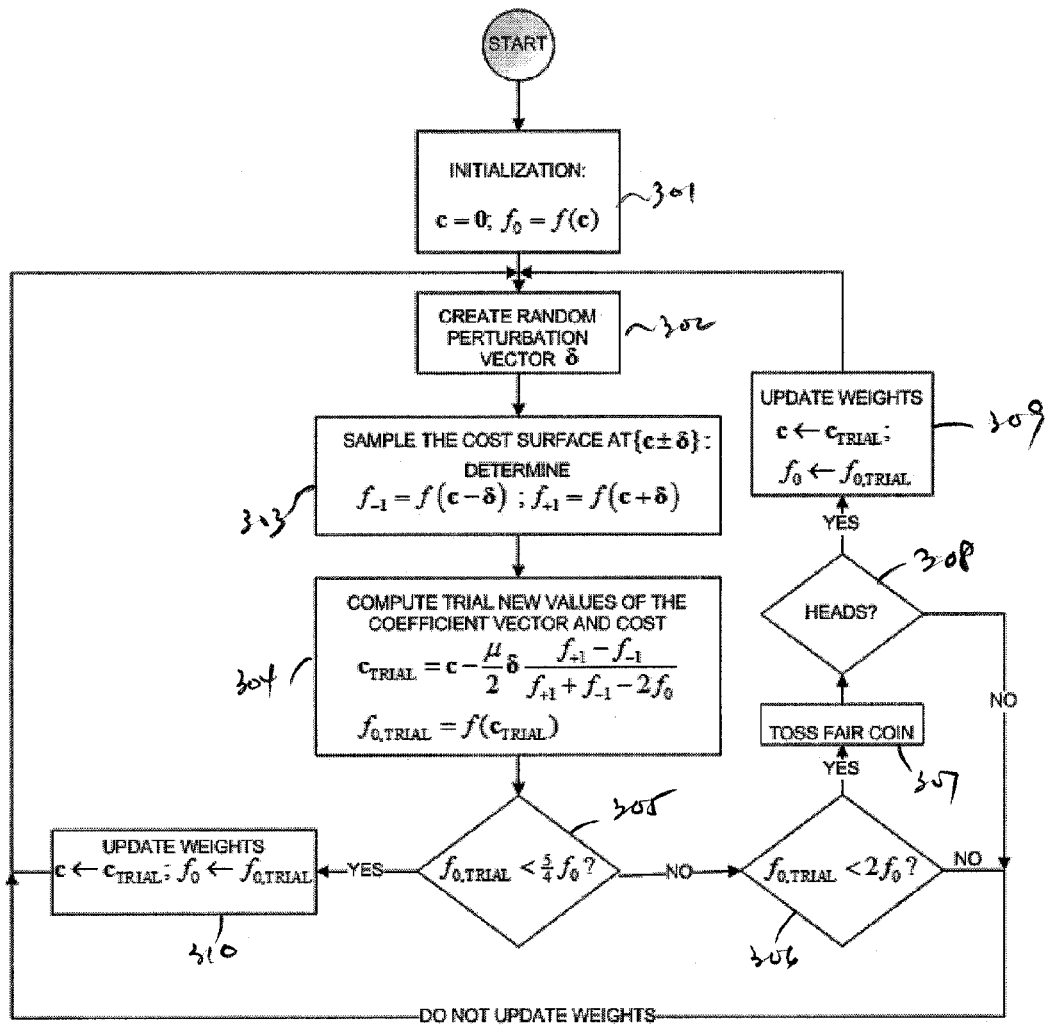
Figure 3. Flowchart for adaptive method.

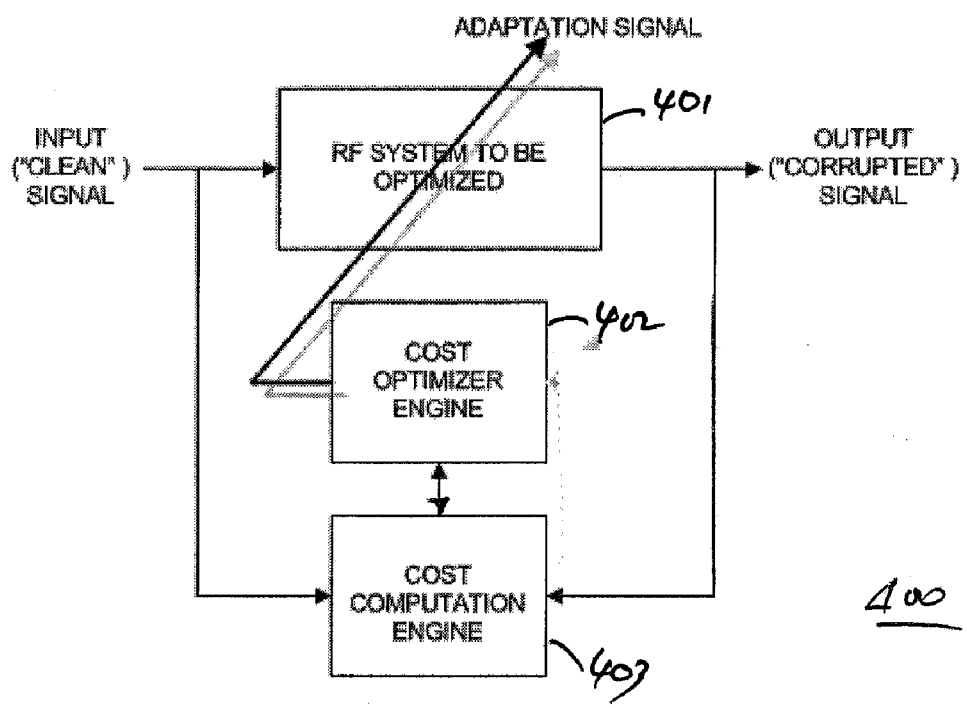
Figure 4. An example implementation/application of the Invention.

METHOD AND APPARATUS TO OPTIMIZE ADAPTIVE RADIO-FREQUENCY SYSTEMS

BACKGROUND OF THE INVENTION

1. Field of the Invention

The present invention relates to analog integrated circuit design. In particular, the present invention relates to techniques for adaptively adjusting circuit parameters to improve signal quality in an analog circuit.

2. Discussion of the Related Art

In many analog integrated circuits (e.g., electronic pre-distort or post-distort circuits, interference-cancellers, or crest-factor reducers), an adaptive system improves signal quality. In such an adaptive system, an on-chip adaptation circuit reduces a signal degradation measure (or "figure of merit"), which is sometimes referred to as the "cost" or "cost function." In such a scheme, when the cost is reduced to a target value, preferably zero, the signal achieves its highest signal quality.

In many adaptive systems, a useful "cost" that may be used includes (a) a mean or average square of an error signal, the error signal being the difference between the actual signal achieved and the desired signal, or (b) an energy of an interfering or a desired signal within or without a specific frequency band. The cost may be expressed, for example, as a function of one or more coefficients that can be adaptively updated ("adapting coefficients"). In that case, the set of adapting coefficients can be represented by the vector c and the cost may be represented by the function $f(c)$. The goal in such an adaptive system is to minimize the function $f(c)$ over the possible values of vector c: i.e., to find the value of vector c that results in $$\min_c f(c).$$

Examples of algorithms that can be used to search for $$\min_c f(c)$$

includes "least mean square" (LMS) and "recursive least square" (RLS). Existing algorithms are often inadequate for a given operating environment because:

Cost measurement is stochastic: in the presence of noise, measuring cost at a fixed coefficient c can result in widely fluctuating values of $f(c)$ Cost surface is non-convex: a single, global minimum may not exist. In this case, even if the adaptation reaches a reasonably good solution, a better solution may exist elsewhere.

Cost surface has "long, narrow valleys": (mathematically speaking, the matrix that characterizes the quadratic term of the cost surface has a large eigen-spread). In this case, a conventional gradient-based algorithm (e.g., LMS) takes far too many iterations to converge to an acceptable solution, even when a stochastic or non-convex cost surface is not present.

High computational complexity: in practice, the search algorithm is required to operate in real time in a low-power integrated circuit.

Existing algorithms may be able to perform under some of the conditions described above. For example, RLS has reasonable performance under the "long, narrow valleys" condition. RLS, however, does not perform well under the stochastic cost condition, and is not an algorithm of low computational complexity. Similarly, simulated annealing is a method designed for non-convex function conditions, but does not perform well under a stochastic cost.

SUMMARY

According to one embodiment of the present invention, a performance optimizing circuit is provided for a signal processing system which is parameterized by a set of coefficients that vary the operational characteristics of the signal processing system. The performance optimizing circuit receives as input a reference signal and an output signal of the signal processing system. The performance optimizing circuit may include (a) a cost computation circuit that receives the reference signal and the output signal and provides as output a cost signal representing a cost function computed using a set of current values for the set of coefficients, the output signal and the reference signal; and (b) a cost optimizer circuit that, at each of a plurality of successive time intervals, evaluates one or more values of the cost signal in the cost computation circuit and provides to the signal processing system a new set of values for the set of coefficients. The cost optimizer circuit implements two or more of the random search, parabolic interpolation and hill climbing techniques.

According to one embodiment of the present invention, a method is provided to implement the performance optimizing circuit in which the random search technique selects a set of incremental values for the set of coefficients using a random process. In one implementation, each incremental value may be less than a predetermined integer multiple of a resolution of the corresponding coefficient.

According to one embodiment of the present invention, the method uses the parabolic interpolation technique to provide the new set of values for the set of coefficients based on varying the set of current values using the set of incremental values selected by the random search technique. In one implementation, the set of current values may be varied by adding each coefficient to an integer multiple of the corresponding incremental value. The parabolic interpolation technique may compute a set of corrective values to adjust the set of current values for the set of coefficients, such that adjusted values provide a minimum in the cost function. The new set of values may correspond to adjusting the set of current values, with each current value being adjusted by the products of an adjustment factor and the corresponding corrective value. The adjustment factor may be less than 1.0, and which may decrease over time. In one implementation, the new set of values may result from adjusting a product of a leakage term and each current value.

According to one embodiment of the present invention, the method uses a hill-climbing technique which rejects the new set of values for the set of coefficients when a figure of merit obtained from the new set of values and a set of current values for the set coefficients exceeds a predetermined threshold value. In one implementation, the hill-climbing technique rejects also the new set of values at a predetermined probability, when the figure of merit exceeds a second predetermined threshold value.

The present invention is better understood upon consideration of the detailed description below in conjunction with the accompanying drawings,

BRIEF DESCRIPTION OF THE DRAWINGS

FIG. 1 illustrates the path of a coefficient vector's evolution in a 3-dimensional coefficient space.

FIG. 2 illustrates a parabolic interpolation technique.

FIG. 3 is a flow chart which illustrates a method that uses the above three principles of minimization, according to one embodiment of the present invention.

FIG. 4 shows an implementation of optimized circuit 400, according to one embodiment of the present invention.

DETAILED DESCRIPTION OF THE PREFERRED EMBODIMENTS

According to one embodiment of the present invention, three techniques may be used to provide an adaptive system: (a) "random search", (b) parabolic interpolation, and (c) hill climbing.

The random search technique seeks an optimal (i.e., cost-minimizing) coefficient vector using a sequence of successive approximations. In one embodiment of the present invention, from a present coefficient vector, in a next iteration of the random search, the method searches an optimal coefficient vector along a random direction. FIG. 1 illustrates the path of a coefficient vector's evolution in a 3-dimensional coefficient space. As shown in FIG. 1, in one iteration—which may be the very first iteration—the coefficient vector c has value $c_0$. According to the random search technique, a random direction $\delta$ is selected, which need not have a fixed relationship with respect to any of the co-ordinate axes. Random direction $\delta$ is a vector having the same dimension as the coefficient vector c and has entries that may be, for example, either +p or −p with equal probability. The magnitude p of each entry of $\delta$ may nominally be set, for example, to the smallest amplitude resolution. In a very high-resolution implementation, setting p=1 LSB may result in a slow adaptation. For faster adaptation, p may be set to a higher value (e.g., 2 or 3 LSBs). The random sign associated with an entry of $\delta$ may be generated using a pseudo-noise algorithm, using Hadamard codes, or another suitable random number generation method.

FIG. 2 illustrates the parabolic interpolation technique. As shown in FIG. 2, after having selected a random search direction, the next approximation to the minimum cost may be provided by the minimum value of the parabola that interpolates between five samples ("5-way scheme") of the cost, each sample being based on that randomly selected direction using the random search technique. Alternatively, as shown in FIG. 2, the next approximation to the minimum cost may be provided by the minimum of a parabola that interpolates between three samples ("3-way scheme"). In fact, any suitable number of sample points may be used. Parabolic interpolation can be shown to be equivalent to a Newton-Raphson minimization along the randomly selected direction. The five (or three) samples may include the sample at the present approximation $c_0$.

Mathematically, assuming that the present coefficient vector c, in addition to the sample at $c_0$, where the cost is given by $f_0 = f(c)$, the parabolic interpolation scheme calls for evaluating the costs at perturbations points $\{c \pm \delta\}$ (for a 3-way scheme), or $\{c \pm \delta, c \pm 2\delta\}$ (for a 5-way scheme). Accordingly, the additional costs are evaluated at these perturbations are, for a 5-way scheme:

$f_{-2} = f(c-2\delta)$, $f_{-1} = f(c-\delta)$, $f_{+1} = f(c+\delta)$, and $f_{+2} = f(c+2\delta)$.

for a 3-way scheme:

$f_{-1} = f(c-\delta)$, and $f_{+1} = f(c+\delta)$

In a 3-way scheme, the new approximation for vector c is given by:

$$c \leftarrow c - \frac{\mu}{2} \delta \frac{f_{+1} - f_{-1}}{f_{+1} + f_{-1} - 2f_0}, \quad (1)$$

Similarly, the new approximation for vector c under a 5-way update is given by:

$$c \leftarrow c - \frac{\mu}{2} \delta \frac{14(f_{+2} - f_{-2}) + 7(f_{+1} - f_{-1})}{10(f_{-2} + f_{+2}) - 5(f_{-1} + f_{+1}) - 10f_0} \quad (2)$$

In each of equations (1) and (2), $\mu$ is a "step size" parameter, which trades speed with noise-immunity. Nominally, $\mu$ may be set to unity, in which case the new value for vector c is exactly the minimum of the interpolating parabola. If $\mu$ is set to a value less than unity, then the new vector c does not go "all the way" to the minimum of the interpolating parabolic function. For noisy environment (i.e., a situation in which cost evaluation is deemed not reliable), a value $\mu < 1$ may be used.

Although either the 3-way update or the 5-way update may be used in practice, the 5-way update provides greater noise immunity. The 5-way update, however, is slower, because of the greater number of cost samples that are evaluated. Noise susceptibility may be alleviated, as explained above, by reducing step size parameter $\mu$, at the cost of a slower convergence.

The hill climbing technique may be used when noise interferes with cost measurement, or when the cost surface is non-convex. Under such conditions, an updated coefficient vector may occasionally be higher in cost than the coefficient vector at the immediately previous iteration. The higher cost may be merely due to noise in the updated coefficient vector, or if the updated coefficient vector has legitimately "moved uphill". The hill climbing technique tolerates such uphill movement, to allow the cost function to reach an even lower minimum. One implementation of the hill climbing technique uses a predetermined lower threshold and a predetermined upper threshold. When an uphill move results in the new cost that is less than the predetermined lower threshold (i.e., the new cost is less than 125% of the previous cost), the new cost is accepted. Alternatively, in one embodiment of the present invention, when the new cost is between 125% of the previous cost and the predetermined upper threshold (e.g., 200% of the old cost), the new coefficient vector is accepted only with a probability of 0.5, and if the new cost is even greater than the predetermined upper threshold, the new coefficient vector is rejected. The lower and upper thresholds may be optimized for particular situations empirically or using simulations. Many variations to the hill climbing technique are possible. For example, when a new cost is between the predetermined lower and upper thresholds, the new coefficient may be accepted with a probability that decreases linearly with increasing new cost.

FIG. 3 is a flow chart which illustrates a method that uses all of the above three principles of minimization, according to one embodiment of the present invention. Although FIG. 3 shows a method that uses a 3-way update (i.e., according to Equation (1)), the principles in the flowchart of FIG. 3 applies equally to a 5-way update (i.e., according to Equation (2)). As shown in FIG. 3, at step 301, an initial coefficient vector c is selected at $c_0$, so that the current cost is given by $f_0=f(c_0)$. At step 302, a perturbation vector $\delta$ is randomly selected. At step 303, the costs at perturbations points $\{c\pm\delta\}$ are calculated according to the equations:

$$f_{-1}=f(c-\delta), \text{ and}$$

$$f_{+1}=\delta(c+\delta)$$

At step 304, using equation (1) above, a trial coefficient vector $c_{TRIAL}$ for coefficient vector c may be computed using the parabolic interpolation technique discussed above:

$$c_{TRIAL} = c - \frac{\mu}{2}\delta\frac{f_{+1}-f_{-1}}{f_{+1}+f_{-1}-2f_0},$$

A new trial cost $f_{TRIAL}$ may be calculated using approximation $c_{TRIAL}$ $$f^{TRIAL}=f(c_{TRAIL})$$

At step 305, the approximate cost $f_{TRIAL}$ is compared to 1.25 times of current cost $f_0$. If $f_{TRIAL}$ is less than 1.25 times of current cost $f_0$, at step 310, the trial coefficient vector $c_{TRIAL}$ and the trial cost $f_{TRIAL}$ are adopted as the current coefficient vector c and current cost $f_0$. The process then returns to step 302. Otherwise, at step 306, if $f_{TRIAL}$ is not less than 1.25 times of current cost $f_0$, $f_{TRIAL}$ is further compared with twice current cost $f_0$. If $f_{TRIAL}$ is not less than twice current cost $f_0$, the process returns to step 302 to select a new random perturbation vector 8, without updating the current coefficient and the current cost. Otherwise, at step 307, a binary random process is used to determine whether or not to update the current coefficient vector and current cost by trial coefficient vector $c_{TRIAL}$ and trial cost $f_{TRIAL}$. One appropriate binary process is the "fair coin" which is a random process which is equally probable in providing a "head" outcome or a "tail" outcome. In the process of FIG. 3, if step 307 provides a head outcome (step 308), at step 309, trial coefficient vector $c_{TRIAL}$ and trial cost $f_{TRIAL}$ are adopted as the current coefficient vector c and current cost $f_0$, before returning to step 302. Otherwise, i.e., a tail outcome at step 308, the process returns to step 302 to select a new random perturbation vector 8, without updating the current coefficient and the current cost.

FIG. 4 shows an implementation of optimized circuit 400, according to one embodiment of the present invention. Optimized circuit 400 may be implemented using custom hardware or a general-purpose micro-processor. Optimized circuit 400 includes an RF system 401 to be optimized, which may be parameterized by coefficient vector c. A cost computation engine 403, which computes a selected cost function based on a current or trial value of the coefficient vector, a reference signal and the output signal of RF system 401 (e.g., the input "clean" signal and the output signal of RF system 401, respectively) drives cost optimizer engine 402. Optimizer engine 402 updates the coefficient vector c via an adaptation signal, based on the cost functions computed in cost computation engine 402. Cost optimizer engine 402, which implements, for example, the flow chart of FIG. 3, may be implemented by custom hardware or a general purpose microprocessor. The following systems are suitable RF systems to which the present invention is applicable:

(a) a parameterized power amplifier with a preceding linearizer stage with a cost function which may be, for example, the square of the difference between the input signal and output signal, and the out-of-band component of the output signal;

(b) a parameterized low-noise amplifier followed by a linearizing stage with a cost function which may be, for example, an in-band component ("error-vector magnitude") of the output signal; or (c) a radio-frequency repeater followed by a parameterized echo-canceller, with a cost function which may be, for example, the magnitude of undesirable copies of the output signal ("echoes") appearing at the input terminal.

The method of FIG. 3 is preferably be further improved because (a) local minima may produce different minimized costs at steady-state ("run-to-run variation") from different runs; and (b) even for a single run, a large amplitude fluctuation may occur around a steady-state minimized cost ("misadjustment" or "bumpiness"). A practical implementation should reliably converge to a minimum with minimal misadjustment, and be able to track environmental changes.

According to one embodiment of the present invention, among the competing local minima, the desired minimum also minimizes the squared-norm of coefficient vector c. The squared-norm minimization can be achieved using the so-called "leaky" update. Under leaky update, equations (1) and (2) are modified respectively to, for example:

$$c \leftarrow \beta c - \frac{\mu}{2}\delta\frac{f_{+1}-f_{-1}}{f_{+1}+f_{-1}-2f_0}, \text{ and} \tag{3}$$

$$c \leftarrow \beta c - \frac{\mu}{2}\delta\frac{14(f_{+2}-f_{-2})+7(f_{+1}-f_{-1})}{10(f_{-2}+f_{+2})-5(f_{-1}+f_{+1})-10f_0} \tag{4}$$

where $\beta$ is the "leakage parameter," set to a number close to unity (e.g., 0.9995). In a finite-precision implementation which does not allow for a number close to unity, leaky update of an arbitrary precision may be achieved by mixing a number of successive non-leaky updates (i.e., using equations (1) and (2)) with one or more leaky updates (i.e., using equations (3) and (4)) of allowable precision. Using leaky adaptation reduces or eliminates run-to-run variations.

According to one embodiment of the present invention, a method reduces step-size $\mu$ over time. Once a certain performance is reached (e.g., when the cost falls below a predetermined threshold), the step-size $\mu$ may be reduced (e.g., by 50%, or according to another technique). Alternatively, the step size may be reduced according to a cost schedule (e.g., multiple thresholds, calling for a different step size as each threshold is reached). By systematically reducing step size $\mu$ fall towards zero, misadjustment is controlled, while the method tracks changes at a progressively slower.

In the following, we define as N the numerator of the correction term of equations (1) or (2), and D the denominator of the correction term of equations (1) or (2), respectively:

$N \square f_{+1}-f_{-1}$ for 3-way, and $N \square 14(f_{+2}-f_{-2})+7(f_{+1}-f_{-1})$ for 5-way.

and, $D \square f_{+1}+f_{-1}-2f_0$ for 3-way, and $D \square 10(f_{-2}+f_{+2})-5(f_{-1}+f_{+1})-10f_0$ for 5-way.

If the interpolating parabola has a maximum (not a minimum) or the parabola is the degenerate case of a line, then one method chooses the sample corresponding to the least cost—rather than the parabolic extremum—as the next value of the coefficient. The maximum or the degenerate case occurs when $D \leq 0$.

When the predicted parabolic minimum is further than 2p away from the current value of the coefficient, equations (1) and (2) represent a parabolic extrapolation, not an interpolation. According to one embodiment of the present invention, one method does not update the value of the coefficient according to equations (1), (2) (or, likewise, equations (3) and (4)), but chooses instead the sample corresponding to the least cost. This condition corresponds to $|N|>4|D|$.

For a method that uses a 5-way interpolation, sampling the cost in the order $c-2\delta$, $c+2\delta$, $c-\delta$, $c+\delta$, is likely to be more noise-advantageous than in another order. This is to symmetrize (about the cost-axis of FIG. 2) the interpolating parabola in a noisy or changing-power situation.

In order to weigh one or more dimensions of c over the other dimensions, one method optimizes a subset of all dimensions in one iteration. The desired effect may be achieved by using non-zero entries in only a fraction of the dimensions of $\delta$. Alternately, each entry of $\delta$ may be assigned $+p$, $-p$, or 0 (rather than just $\pm p$) with predetermined probabilities which are not necessarily equal.

The above detailed description is provided to illustrate the specific embodiments of the present invention and is not intended to be limiting. Numerous variations and modifications within the scope of the present invention are possible. The present invention is set forth in the following claims.

We claim:

1. A performance optimizing circuit for a signal processing system parameterized by a set of coefficients that vary the operational characteristics of the signal processing system, the performance optimizing circuit receiving as input a reference signal and an output signal of the signal processing system, the performance optimizing circuit comprising:
    a cost computation circuit receiving the reference signal and the output signal and which provides as output a cost signal representing a cost function computed using a set of values for the set of coefficients, the output signal and the reference signal; and
    a cost optimizer circuit that, at each of a plurality of successive time intervals, evaluates one or more values of the cost signal from the cost computation circuit and provides to the signal processing system a new set of values for the set of coefficients, the cost optimizer circuit implementing two or more of the random search, parabolic interpolation and hill climbing techniques.

2. A performance optimizing circuit as in claim 1, wherein the random search technique selects a set of incremental values for the set of coefficients using a random process.

3. A performance optimizing circuit as in claim 2, wherein each incremental value is less than a predetermined integer multiple of a resolution of the corresponding coefficient.

4. A performance optimizing circuit as in claim 2, wherein the parabolic interpolation technique provides the new set of values for the set of coefficients based on varying the set of current values using the set of incremental values selected by the random search technique.

5. A performance optimizing circuit as in claim 4, wherein the set of current values are varied by adding each coefficient to an integer multiple of the corresponding incremental value.

6. A performance optimizing circuit as in claim 5, wherein the parabolic interpolation technique computes a set of corrective values to adjust the set of current values for the set of coefficients, such that adjusted values provide a minimum in the cost function.

7. A performance optimizing circuit as in claim 6, wherein the new set of values correspond to adjusting the set of current values each adjusted by the products of an adjustment factor and the corresponding corrective value, wherein the adjustment factor is less than 1.0.

8. A performance optimizing circuit as in claim 7, wherein the adjustment factor decreases over time.

9. A performance optimizing circuit as in claim 6, wherein the new set of values result from adjusting a product of a leakage term and each current value.

10. A performance optimizing circuit as in claim 4, wherein the hill-climbing technique rejects the new set of values for the set of coefficients when a figure of merit obtained from the new set of values and a set of current values for the set coefficients exceeds a predetermined threshold value.

11. A performance optimizing circuit as in claim 10, wherein the hill-climbing technique rejects the new set of values at a predetermined probability, when the figure of merit exceeds a second predetermined threshold value.

12. A method for optimizing a signal processing system parameterized by a set of coefficients that vary the operational characteristics of the signal processing system using a reference signal and an output signal of the signal processing system, the method comprising:
    at each of a plurality of successive time intervals, using two or more of the random search, parabolic interpolation and hill climbing techniques to:
        (a) evaluate one or more values of a cost function based on a set of current values for the set of coefficients, a value of the reference signal and a value of the output signal; and
        (b) provide the signal processing system a new set of values for the set of coefficients.

13. A method as in claim 12, wherein the random search technique selects a set of incremental values for the set of coefficients using a random process.

14. A method as in claim 13, wherein each incremental value is less than a predetermined integer multiple of a resolution of the corresponding coefficient.

15. A method as in claim 13, wherein the parabolic interpolation technique provides the new set of values for the set of coefficients based on varying the set of current values using the set of incremental values selected by the random search technique.

16. A method as in claim 15, wherein the set of current values are varied by adding each coefficient to an integer multiple of the corresponding incremental value.

17. A method as in claim 16, wherein the parabolic interpolation technique computes a set of corrective values to adjust the set of current values for the set of coefficients, such that adjusted values provide a minimum in the cost function.

18. A method as in claim 17, wherein the new set of values correspond to adjusting the set of current values each adjusted by the products of an adjustment factor and the corresponding corrective value, wherein the adjustment factor is less than 1.0.

19. A method as in claim 18, wherein the adjustment factor decreases over time.

20. A method as in claim 17, wherein the new set of values result from adjusting a product of a leakage term and each current value.

21. A method as in claim 15, wherein the hill-climbing technique rejects the new set of values for the set of coefficients when a figure of merit obtained from the new set of values and a set of current values for the set coefficients exceeds a predetermined threshold value.

22. A method in claim 21, wherein the hill-climbing technique rejects the new set of values at a predetermined probability, when the figure of merit exceeds a second predetermined threshold value.

\* \* \* \* \*